United States Patent [19]

Mercil

[11] Patent Number: 6,027,039
[45] Date of Patent: Feb. 22, 2000

[54] ARTICULATING SPRAYER BOOM HINGE

[76] Inventor: LeRoy Joseph Mercil, 303 Wisconsin Ave., Brooks, Minn. 56715

[21] Appl. No.: 09/037,805

[22] Filed: Mar. 10, 1998

[51] Int. Cl.[7] ...................................................... B05B 1/20
[52] U.S. Cl. ........................... 239/159; 239/161; 239/165; 239/166; 239/172
[58] Field of Search ..................................... 239/159, 161, 239/165, 166, 167, 168, 172

[56] References Cited

U.S. PATENT DOCUMENTS

| | | | |
|---|---|---|---|
| 3,565,340 | 2/1971 | Meinert et al. | 239/168 |
| 3,580,505 | 5/1971 | Loeffler | 239/168 |
| 4,044,952 | 8/1977 | Williams et al. | 239/165 |
| 4,200,255 | 4/1980 | Schmidt et al. | 239/167 X |
| 4,215,758 | 8/1980 | Jones | 180/128 |
| 4,288,034 | 9/1981 | Widmer et al. | 239/168 |
| 4,344,572 | 8/1982 | Tyler | 239/168 |
| 4,358,054 | 11/1982 | Ehrat | 239/155 |
| 4,372,492 | 2/1983 | Blumenshine | 239/168 |
| 4,379,522 | 4/1983 | Elliott et al. | 239/167 |
| 4,427,154 | 1/1984 | Mercil | 239/161 |
| 4,449,667 | 5/1984 | Tyler | 239/167 |
| 4,526,236 | 7/1985 | Jacobsen | 172/126 |
| 4,588,128 | 5/1986 | Broyhill et al. | 239/168 |
| 4,646,972 | 3/1987 | McGregor | 239/168 |
| 4,883,127 | 11/1989 | Chevrier | 172/126 |
| 5,000,385 | 3/1991 | Trusty et al. | 239/168 |
| 5,248,091 | 9/1993 | Thyberg | 239/168 |
| 5,310,115 | 5/1994 | Broyhill | 239/168 |
| 5,326,030 | 7/1994 | Benest | 239/1 |
| 5,507,435 | 4/1996 | Benest | 239/1 |
| 5,630,547 | 5/1997 | Klemenhagen et al. | 239/161 |

Primary Examiner—Andres Kashnikow
Assistant Examiner—Robin O. Evans
Attorney, Agent, or Firm—Curtis Harr

[57] ABSTRACT

A hinge assembly for use on a spray boom attached to a sprayer apparatus. This hinge assembly allows the inner and outer boom members to pivot in both the horizontal and vertical planes. The hinge assembly has three primary components the first of which is the boom knuckling hinge. The boom knuckling hinge is the component which allows the outer boom assembly to pivot in the vertical plane. The second component of the hinge assembly is the breakaway portion. This component allows the outer boom to flex in the horizontal plane and in a rearward manner when an obstacle or the ground is inadvertently struck by the outer boom during normal operation. The third and last component of the hinge assembly is the boom folding apparatus. The folding apparatus is used to fold the outer boom against the inner boom for transport and storage purposes. This is accomplished by the use of two hydraulic cylinders, one on each the inner and outer booms, that are attached to the boom hinge.

19 Claims, 10 Drawing Sheets

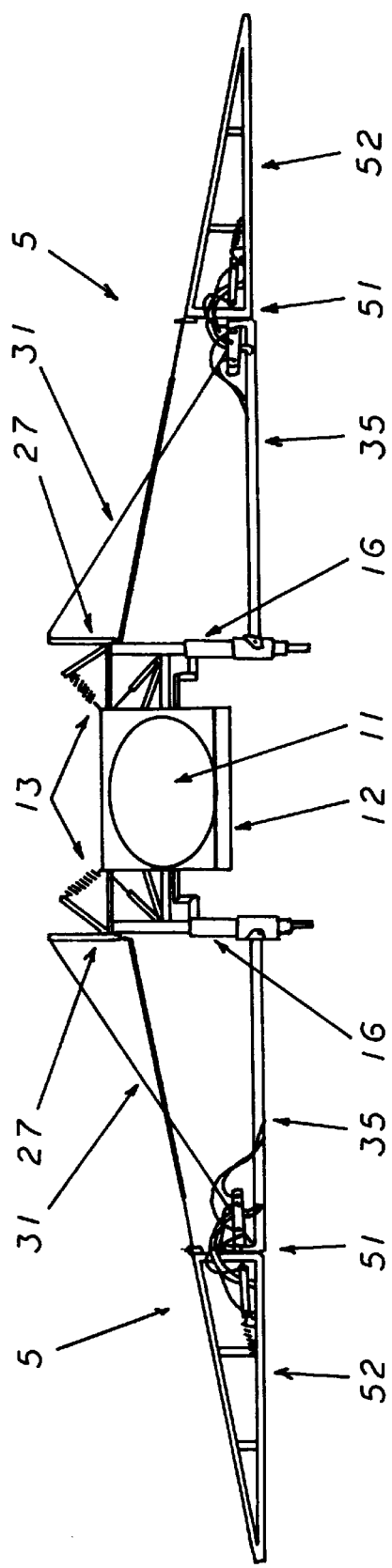

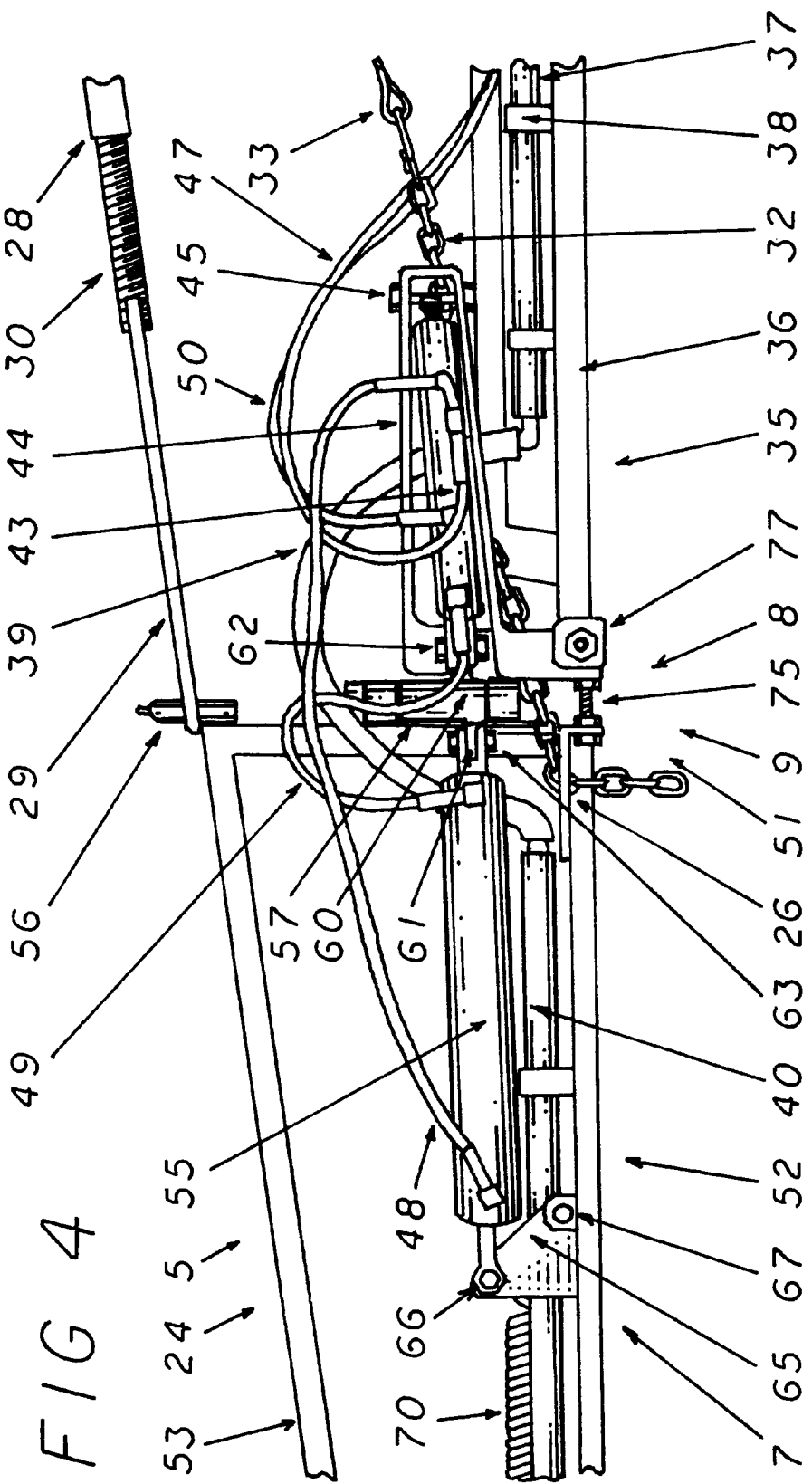

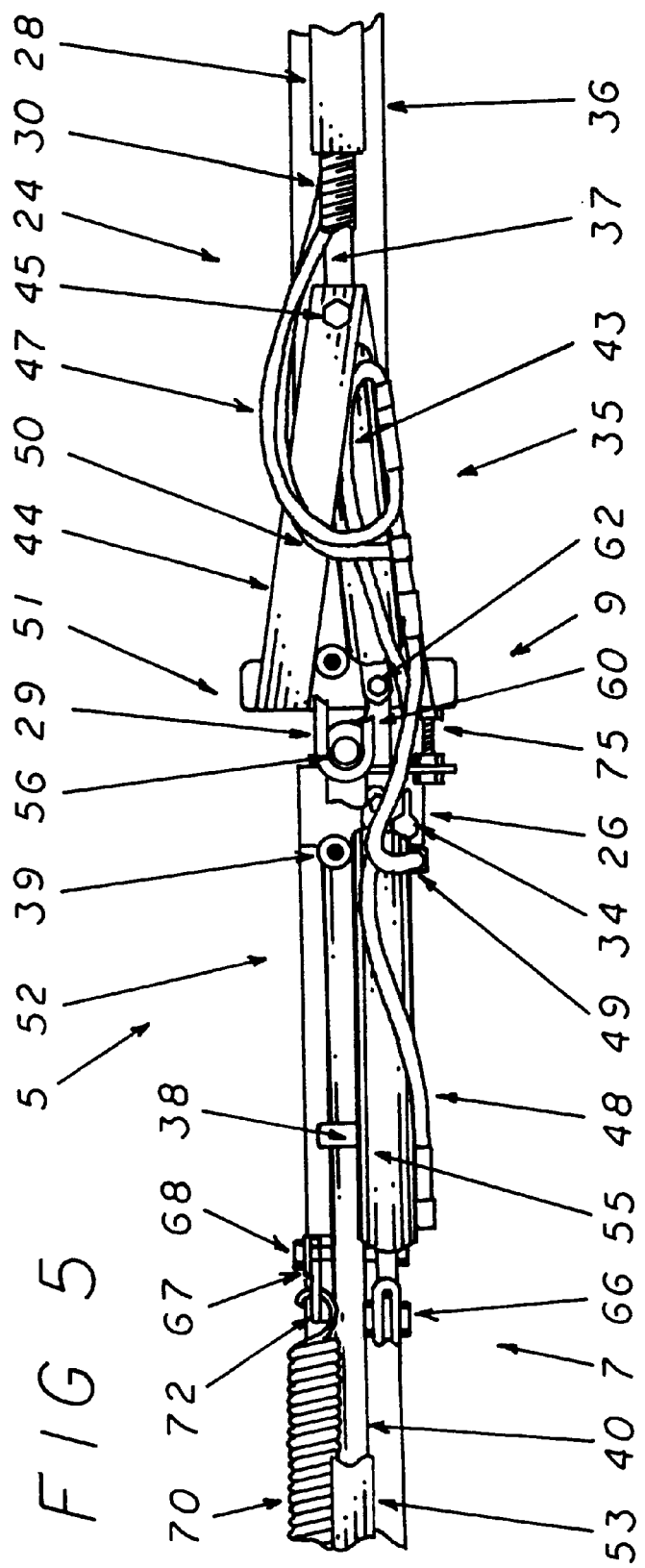

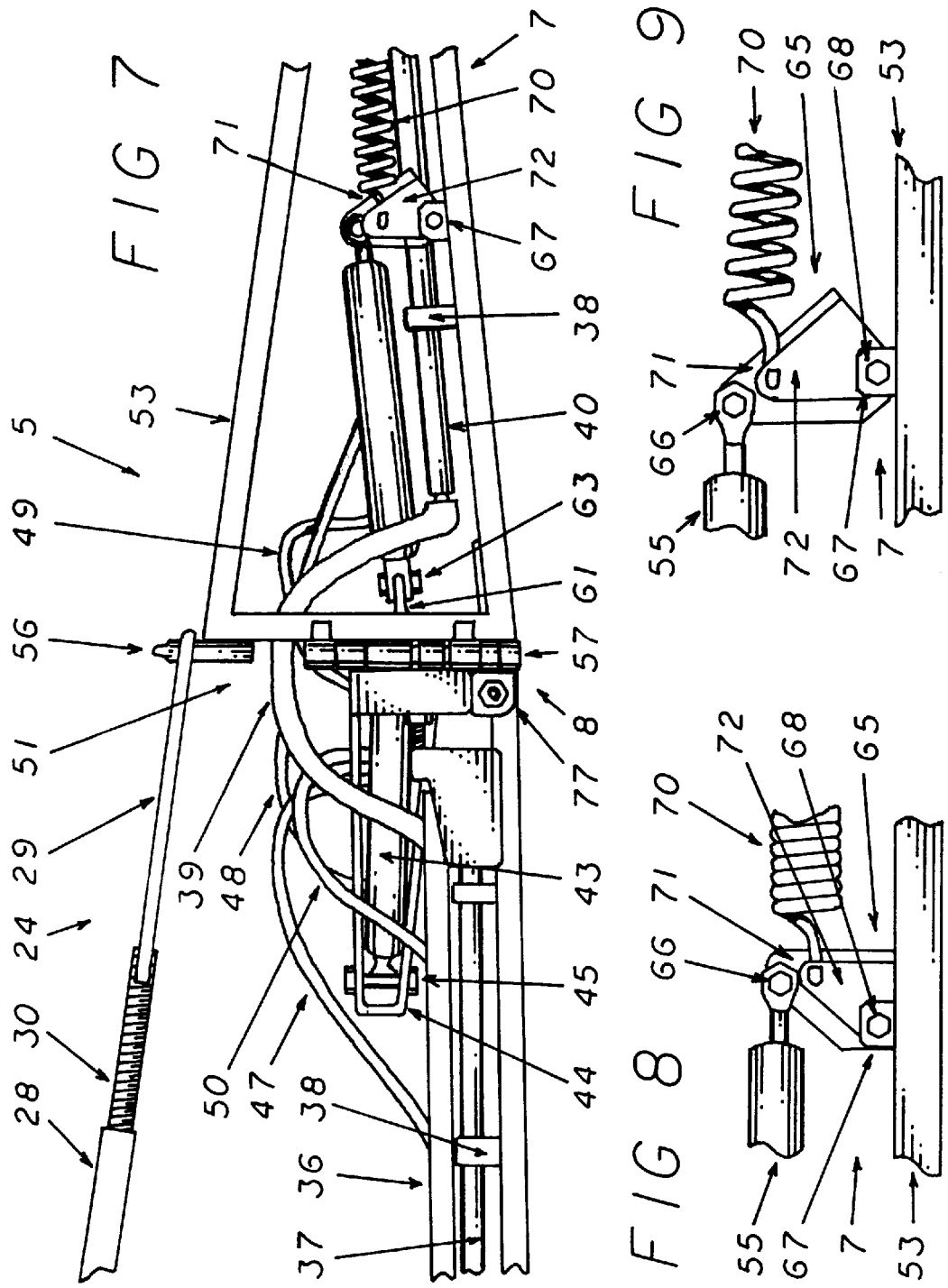

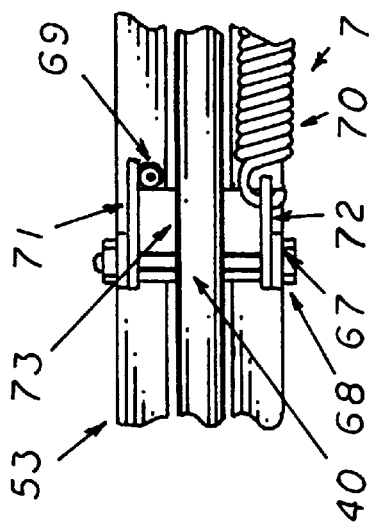
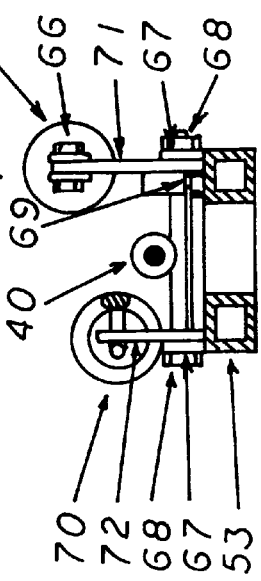
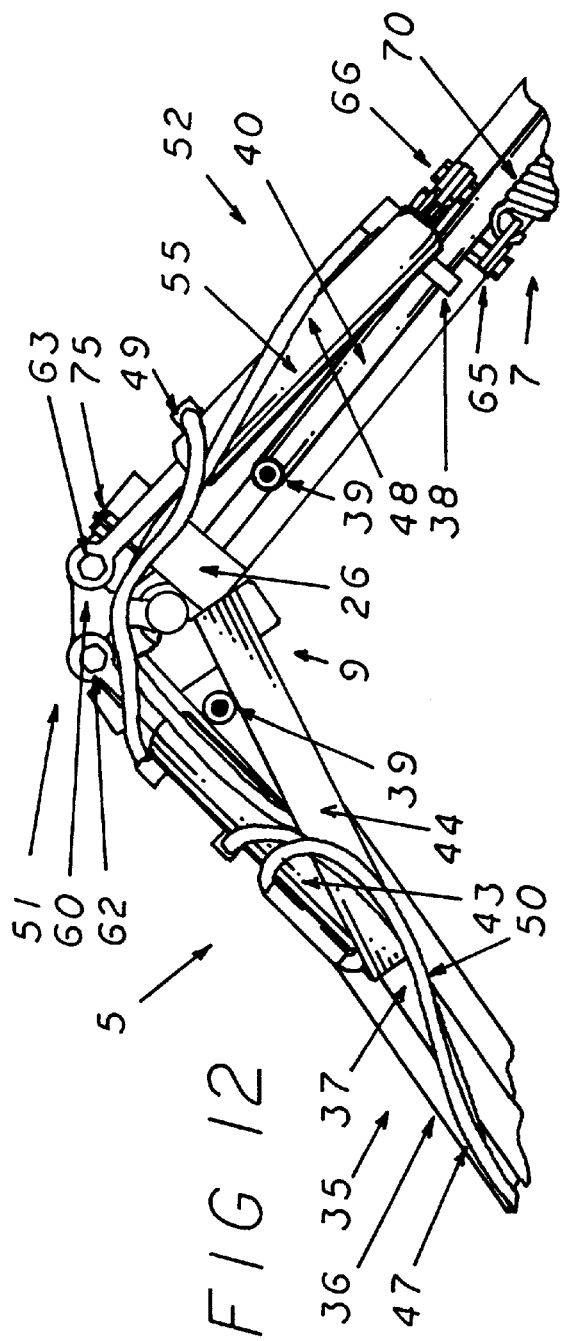

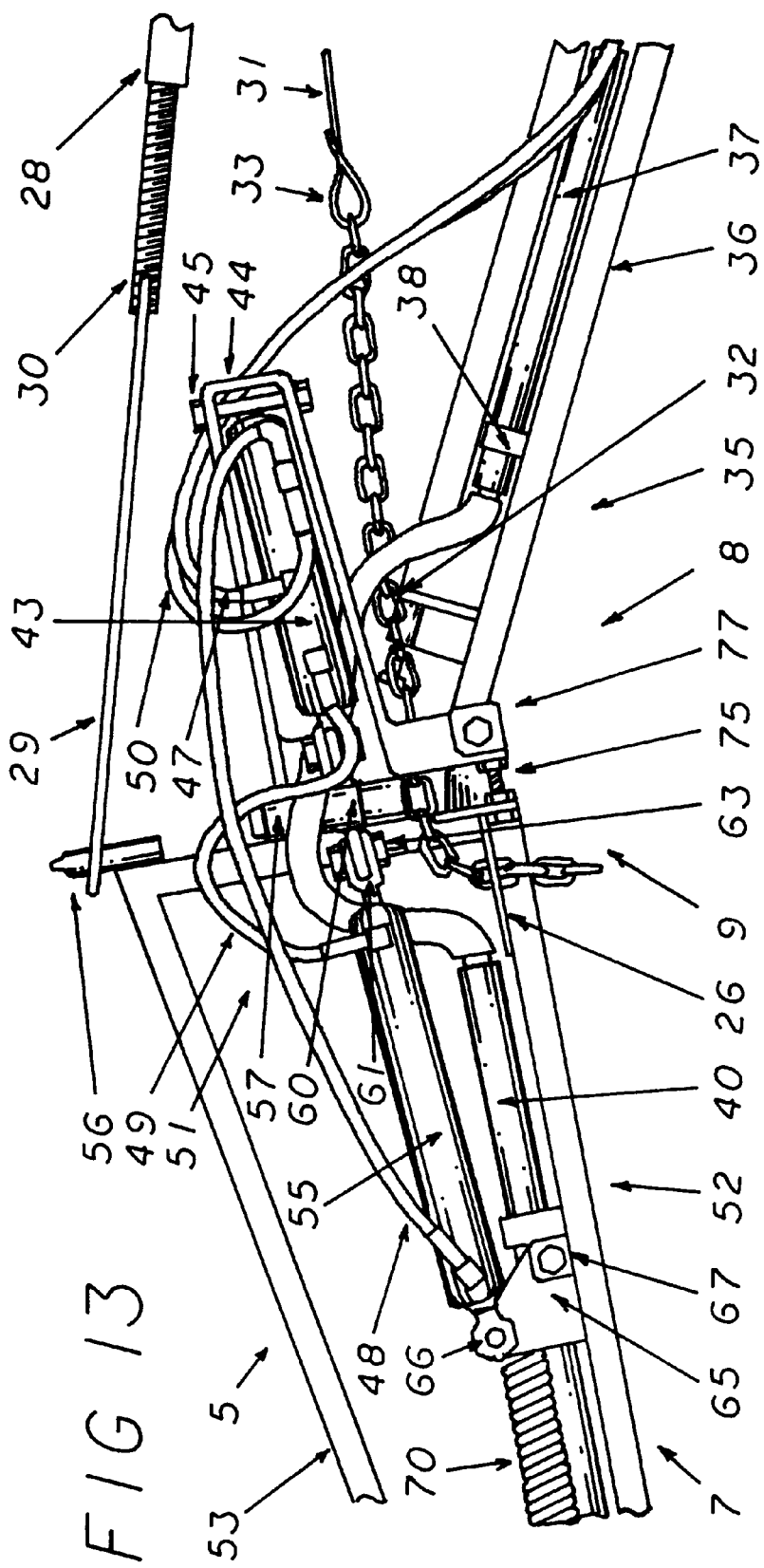

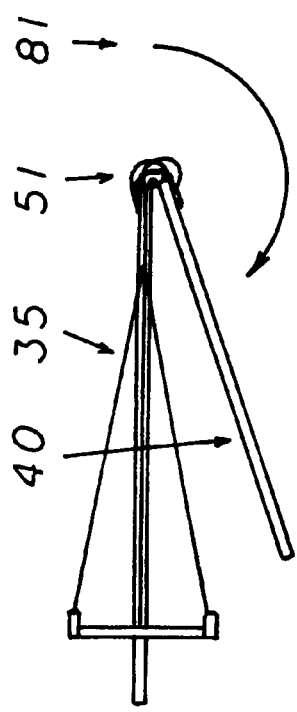
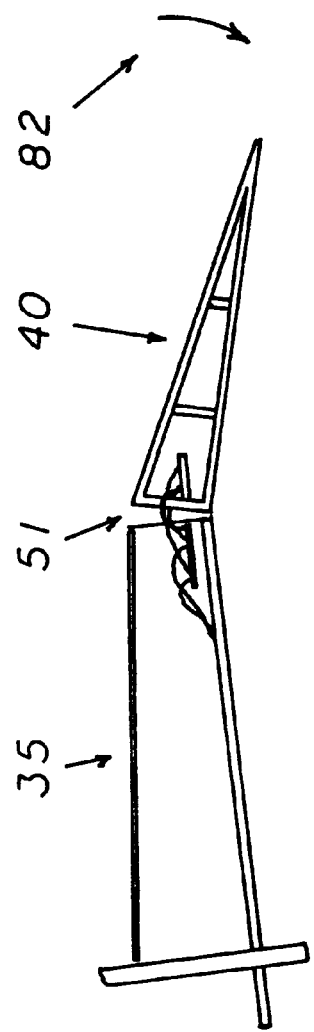

ARTICULATING SPRAYER BOOM HINGE

BACKGROUND OF THE INVENTION

The present invention relates to an improvement in the method employed to apply agricultural chemicals, such as herbicides, pesticides and fertilizers and more specifically, to an articulating sprayer boom hinge assembly for sprayers.

Liquid chemicals such as, herbicides and pesticides are commonly applied by use of a sprayer having long booms. This sprayer may be attached to a tractor, placed in the rear of a pickup, or be of a self-propelled nature. Typically, these sprayers will have long booms reaching out on either side to increase the area sprayed with each pass of the vehicle. As the boom length increases, so does the difficulty in moving the sprayer from one location to another as these booms must be placed in a transport or folded position. The folding of these booms is often accomplished manually by the driver of the rig. A second problem associated with boom length is the stability of the outer ends of the booms. As the boom length extends out from the vehicle pulling the sprayer, the ends of the booms are subject to more up and down movement as the vehicle travels over small bumps and ruts and thus, moves from side to side. A third problem with lengthening the booms is the tendency for the driver to misjudge distances from obstacles such as power poles, trees and fences, thus, running the end of the boom into the obstacles, possibly damaging the boom and the obstacle, and causing costly down time.

The aforementioned problems have been addressed separately by other patents. For example, U.S. Pat. No. 4,372,492 issued to Blumenshine in 1983 discloses a sprayer boom assembly having outer and inner wing sections of which the outer wing is automatically foldable against the inner wing through a translational to rotational movement arrangement. This sprayer is also configured with a breakaway outer spray boom. However, this patent does not allow the outer boom knuckle or flex in a vertical plane at the connection point between the outer and inner booms. This may cause severe vertical end movement of the outer boom as the center of the rig encounters small ruts or bumps. Another patent, U.S. Pat. No. 4,427,154 issued to Mercil, the inventor of present subject, also discloses a sprayer boom assembly. Again, on this boom assembly, the outer and inner boom connection point is solid, thus, not allowing the outer and inner boom to move in the vertical plane relative to each other. A still further invention, is U.S. Pat. No. 3,580,505 issued to Herbert V. Loeffler. This patent discloses a sprayer boom assembly which floats side to side in order to compensate as a vehicle moves over rough terrain, through ruts, or is tilted side to side.

As can be seen, none of the aforementioned patents have been able to disclose a boom assembly which may be folded horizontally by a powered means into a transport position or back into an in-use position, while also supplying a brake away mechanism which automatically resets, and the ability to allow the booms to float over rough terrain or ruts. From this discussion it can be seen that it would be desirable to produce a boom with these features.

SUMMARY OF THE INVENTION

It is the primary objective of the present invention to provide a sprayer boom that is capable of pivoting in a vertical plane at its central point, thus, allowing the separate boom members to adjust independently to varying irregularities in the ground being covered.

It is an additional objective of the present invention to provide a sprayer boom that is designed having an independent outer boom member that is capable of flexing at its central point in a backwards manner that can absorb the shock of impacting an obstacle while the boom and spraying vehicle are traveling in a forward manner.

It is still a further objective of the present invention to provide such a spraying boom apparatus in which the outer boom member can be folded back along the inner boom member by the use of hydraulic cylinders, which allows the whole boom assembly to be folded in to form a compact configuration to facilitate its transportation and storage.

These objectives are accomplished by the use of a spray boom apparatus that is equipped with a centralized hinge assembly that allows the inner and outer boom members to pivot in both the horizontal and vertical planes. The boom pivot has three primary components the first of which is the boom knuckling hinge. The boom knuckling hinge is the component which allows the outer boom assembly to pivot in the vertical plane. This occurs when the wheels of the sprayer vehicle encounter bumps or ruts in the field resulting in the raising of one of the two outboard booms. The outer boom tends to resist this raising effect by pivoting on the hinge and, in effect, lagging behind the upward motion of the inner boom and remaining in a more horizontal attitude in relation to the ground.

The second component of the hinge assembly is the breakaway hinge assembly. This component allows the outer boom to flex in the horizontal plane and in a rearward manner when an obstacle or the ground is inadvertently struck by the outer boom during normal operation. The breakaway capability of the present invention is accomplished by the use of a spring loaded pivoting mount for the rear of the hinge's hydraulic cylinders. It is the hydraulic cylinders that control the hinge's pivoting in the horizontal plane, allowing the rear mounting point for the hydraulic cylinders to move to allow the outer boom rotate around the boom hinge and absorb the shock.

The third and last component of the hinge assembly is the boom folding apparatus. The folding apparatus is used to fold the outer boom against the inner boom for transport and storage purposes. This is accomplished by the use of two hydraulic cylinders, one on each the inner and outer booms, these cylinders are attached to the boom hinge. When pressure is exerted by the cylinders on the hinge, it forces the outer boom to pivot around the hinge to facilitate the folding operation.

For a better understanding of the present invention reference should be made to the drawings and the description in which there are illustrated and described preferred embodiments of the present invention.

DESCRIPTION OF THE DRAWINGS

FIG. 2 is a front elevation view of the general use of the present invention showing the orientation of the two symmetrical spraying booms that are typically used in relation to the chemical tank and frame assembly.

FIG. 3 is a top elevation view of the general use of the present invention showing the orientation of the two symmetrical spraying booms that are typically used in relation to the chemical tank and frame assembly.

FIG. 4 is a front elevation view of the present invention showing the orientation of its major components and the manner in which they work together to form the invention.

FIG. 5 is a top elevation cut-away view of the present invention showing the construction method which allows the spray boom to be folded at the center hinge and to flex at that same hinge by use of the break-away flex spring assembly.

FIG. 7 is a rear elevation view of the present invention showing the manner in which the breakaway spring assembly allows the outer boom to flex in a backward manner when confronting an obstacle.

FIG. 8 is a close-up, cut-away view of the breakaway spring assembly of the present invention detailing its configuration when the outer spray boom is in its normal, or unobstructed, position.

FIG. 9 is a close-up, cut-away view of the breakaway spring assembly of the present invention detailing its configuration when the outer spray boom is in its breakaway position facilitated by its contact with an obstruction.

FIG. 10 is a rear elevation cut-away view of the breakaway spring assembly of the present invention detailing its configuration when the outer spray boom is in its normal, or unobstructed, position.

FIG. 11 is a top elevation cut-away view of the breakaway spring assembly of the present invention detailing its configuration when the outer spray boom is in its normal, or unobstructed, position and having the outer boom hydraulic cylinder removed.

FIG. 12 is a top elevation cut-away view of the present invention detailing the manner in which the inner and outer hydraulic cylinders are used to accomplish the folding of the outer boom onto the inner boom to facilitate a greater ease in transport and storage.

FIG. 13 is a front elevation cut-away view of the present invention showing the manner in which its components allow the inner and outer boom assemblies to pivot independently of one another along a vertical plane.

FIG. 17 is a top elevation view of the present invention showing the manner of movement when the outer boom is folded in on the inner boom by use of the inner and outer hydraulic cylinders for transport and storage.

FIG. 18 is a front elevation view of the present invention showing the manner of vertical plane movement of the inner and outer spray booms around the knuckling hinge allowing the inner and outer boom to remain independently level over uneven terrain.

DESCRIPTION OF THE PREFERRED EMBODIMENT

Figure 1:
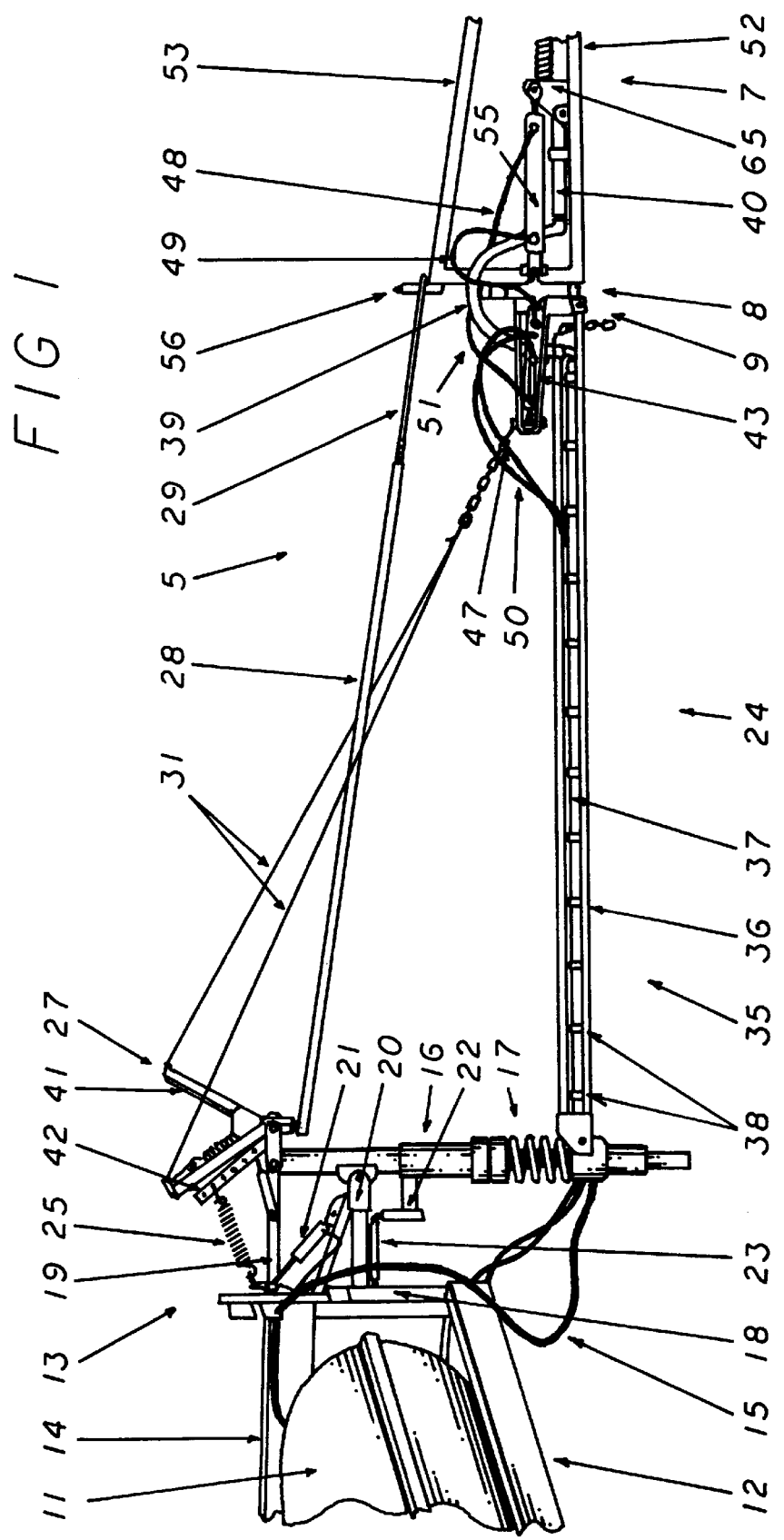
FIG. 1 is a perspective view of the general use of the present invention showing it in its typical application as attached to and used in conjunction with an agricultural chemical holding tank and frame assembly.

Referring now to the drawings, and more specifically to FIGS. 2 and 3, the articulating sprayer boom hinge 5 as generally configured is a made up of an inner spray boom 35 and an outer spray boom 52. The inner and outer spray booms, 35 and 52, are joined at the center of their joint span by the boom hinge assembly 51 which provides the articulating capabilities central to the theme of the present invention. The boom assembly 24 is attached to either side of a sprayer frame 12 which provides the structure upon which a chemical tank 11 is placed. It is the chemical tank 11 that holds the agricultural chemicals that are to be applied by the inner and outer sprayer booms, 35 and 52. This whole apparatus is typically towed as a trailer unit or as part of a driven vehicle such as a tractor or truck to apply the desired chemicals.

The purpose of the boom assembly 24 is to provide an even spray of agricultural chemical to a large area. This is accomplished by transferring the chemical contained in the chemical tank 11 to the boom assembly 24 by means of the tank to boom chemical feed line 15. Once the chemical reaches the boom assembly 24, it passes into the inner boom chemical feed line 37 through which it travels to a series of spray feed line nozzles/mounts 38 contained along the entire length of the inner and outer booms, 35 and 52. The transfer of the chemical from the inner boom chemical feed line 37 to the outer boom chemical feed line 40 (thus, passing the hinge assembly 51), is accomplished by the use of the chemical feed junction line 39 which is a length of loose chemical feed line that is long enough to allow the hinge assembly 51 to freely articulate as required by the design parameters of the present invention.

The inner spray boom 35 is attached to and supported by the center spray boom 14 and the mount assembly vertical frame member 18, located behind the chemical tank 11 and the sprayer frame 12, by the inner boom support shaft 17 and the sprayer boom mounting assembly 13. Additional support for the inner and outer spray booms, 35 and 52, is supplied by the boom support cables 31 which are attached at their outer ends to the most inward lower corner of the outer spray boom 52 and at their inward ends to the two upper portions of the cable lift/support Y-members 27 which are in turn pivotally attached to the most upper end of the inner support shaft 16. The use of these two support systems provide the structural integrity necessary to ensure that the inner and outer spray booms, 35 and 52, will remain in their desired positions.

The configuration and operation of the sprayer boom mounting assembly 13 are detailed in FIG. 1. The sprayer boom mounting assembly 13 is the component of the present invention which supports and ties the boom assembly 24 to the sprayer frame 12, the mount assembly vertical frame member 18 and the sprayer center boom 14. The mounting function is accomplished by the use of the upper cross member 19 and the lower cross member 20. Each of these is pivotally mounted at their inner most end to the mount assembly vertical frame member 18 and at their outer most ends to the vertical inner boom support shaft 16 which allows the inner boom support shaft to move in a vertical fashion in respect to the mount assembly vertical frame member 16. Additionally, the space between the mount assembly vertical frame member 18 and the inner boom support shaft 16 is also spanned by the tank to boom chemical feed line 15 which supplies the chemical to the boom assembly 24 during spraying operations.

Additionally, the lower cross member 20 is equipped with a diagonally mounted lower cross member hydraulic cylinder 21 which is at one end attached to the most forward portion of the lower cross member 20 and at the other to a point on the mount assembly vertical frame member 18 just below the upper cross member 19. The cross member hydraulic cylinder 21 works in conjunction with the pivotally mounted upper and lower cross members, 19 and 20, to control the position of the inner boom support shaft 16, which has pivotally attached towards its lower end the lower inner boom arm 36 just below the inner boom support shaft spring 17. Therefore, changing the position of the inner boom support shaft by the use of the cross member hydraulic cylinder 21, allows the operator vary the height of the boom assembly 24 in relation to the ground depending upon the conditions and the type of chemical being applied.

The space between the mount assembly vertical frame member 18 and the inner boom support shaft 16 is also spanned by the boom pivoting arm 22 and the boom pivoting arm hydraulic cylinder 23. The boom pivoting arm 22 is attached at its most outward end to the inner boom support shaft 16 and extends inward to a point to where it is attached to the boom pivoting arm hydraulic cylinder 23 which in turn is attached to the mount assembly vertical frame member 18. The boom pivoting arm 22 is used to pivot the entire boom assembly 24 during folding and unfolding operation. This function is accomplished by opening the boom pivoting arm hydraulic cylinder 23 which forces the boom pivoting arm 22 in an outward manner. This applies rotational force to the inner boom support shaft 16 which folds the boom assembly 24 in for transport or storage. To unfold the boom assembly 24, this process is simply reversed by closing the boom pivoting arm hydraulic cylinder 23.

The sprayer boom mount assembly 13, and more specifically the inner boom support shaft 16, provides the mounting point for the cable lift/support Y-member 27 which is pivotally mounted to the most upper portion of the inner support shaft 16. The cable lift/support member 27 has two oppositely oriented diagonal Y-member arms 41 extending up from its pivotal mount to which are attached the two boom support cables 31 that extend down to, and attach to by the means of the boom support cable eye 33, the boom support chain 32 which is in turn attached to the boom assembly 24. This attachment is accomplished by passing the boom support chain 32 through and locking it in at the desired length in the chain stop notch 34 located at the very front bottom corner of the outer boom 52 in the chain notch plate 26. The boom support cables 31 and the boom support cable 32 provide the support necessary to suspend the boom assembly 24 in a horizontal position over the ground to be sprayed.

The cable lift/support Y-member 27 also has another upwardly extending rear diagonal Y-member arm 42, which is perpendicularly oriented in respect to the diagonal Y-member arms 41, and provides the point of attachment for the Y-member tensioning spring 25. The Y-member tensioning spring 25 is attached at its opposite end the most rearward portion of the upper cross member 19 and, thus, facilitates and also limits the pivotal travel of the cable lift/support Y-member 27. The pivotal nature of this component of the present invention is important as it allows the boom assembly 24 to flex in an up and down motion while still providing the support necessary to suspend it horizontally over the ground.

Additionally, the cable lift/support Y-member 27 also provides the pivotal attachment point, at its lowest most surface, for the upper truss tube 28 which forms the upper arm of the inner boom 35. The upper truss tube 28 extends outward from the cable lift/support Y-member 27 in an attitude that roughly parallels the inner boom arm 35 to the upper inside corner of the outer boom 52 where it engages to the outer boom eye hinge 56. The most outward portion of the upper truss tube 28 contains the truss tube connection eye 29 and the truss length adjustment screw 30. It is the truss tube connection eye 29 that engages the outer boom eye hinge 56 which ties the upper edge of the outer boom 52 to the boom mounting assembly 13. This is accomplished by constructing the truss tube connection eye 29 by bending a length of metal so that forms two parallel sides having one end closed by the bend. The open end of this component is then permanently attached to the outer most end of the truss length adjustment screw 30. This design forms an entirely closed component having a narrow longitudinal opening between the two parallel sides of the truss tube connection eye 29 and which runs its entire length. The outer boom eye hinge 56 then fits within this opening and is then free to travel within the length of it to allow for adjustment for varying attitudes of the boom assembly 24.

The manner of construction of the primary components of the present invention are detailed in FIGS. 1, 4 and 5. The boom assembly 24 is made up of the inner boom 35 (which extends from the boom mounting assembly 13 to the center), the outer boom 52 (which extends from the center to the outer edge) and the boom hinge assembly 51 (which joins the inner and outer booms 35 and 52). The focus of the present invention is primarily concerned with the hinge assembly 51.

The hinge assembly 51 is made up of the breakaway assembly 7, the knuckling assembly 8 and the folding assembly 9, which are independent of one another but act in conjunction to form the present invention. The breakaway assembly 7 consists of a breakaway mount block 65 (further illustrated by FIGS. 8, 10 and 11) which is pivotally attached to the lower outer boom frame 53 by the use of two breakaway mount block pivot plates 67 which are square shaped tabs of metal, extending up from either outside upper surfaces of the outer boom frame 53. The front lower portion of the breakaway mount block 65 fits between the two mount block pivot plates 67 and the pivot plate bolt 68 passes through the assembly and is loosely fastened to hold the breakaway mount block 65 in place while allowing it to pivot around the pivot plate 67.

Located directly behind the breakaway mount block 65 is the breakaway load spring 70 which is attached at its rearward point to the outer boom frame 53 and at its forward point to the spring mount plate 72. The spring mount plate 72 is a vertical metal plate that forms one of the outer walls of the breakaway mount block 65 and is attached along is inside lower surface to mount block base plate 73 which spans the width of the outer boom frame 53. The spring mount plate 72 also has a hole drilled into its upper rear portion through which the leading end of the breakaway load spring 70 is passed to secure the attachment. The breakaway mount block 65 also is equipped with a mount block stop bolt 69 which is attached to the base plate 73 of the mount block 65. The mount block stop bolt 69 is adjustable to vary the outer hydraulic cylinder's 55 travel to insure proper position of the outer boom 52 in the transport and in-use position.

The other outer vertical wall of the breakaway mount block 65 is the formed by the cylinder mount plate 71 which is also attached along its lower edge to the mount base plate 73. Therefore, the spring mount plate 72, the cylinder mount plate 71 and the base plate 73 form the U-shaped breakaway mount block 65 of the breakaway assembly 7. The cylinder mount plate 71 also serves as the mounting point for the rear end of the outer boom hydraulic cylinder 55 which is facilitated by the use of the outer boom cylinder rear mounting bolt 66.

The outer boom hydraulic cylinder 55 is primarily part of the fold assembly 9 of the present invention. From its rear point of mounting on the breakaway mount block 65, the outer boom hydraulic cylinder 55 extends forward to the front edge of the outer boom 52 where it is attached to the boom pivot hinge 57 which is in turn is permanently attached to the outer boom frame 53. The boom pivot hinge 57 is made up of a series of metal cylinders which are alternatively attached to points on the inner and outer booms, 35 and 52, and which have a boom pivot hinge pin 58 running through their interiors. This configuration allows the inner and outer booms, 35 and 52, to freely pivot around the pivot hinge pin 58.

The extent of travel of the inner and outer booms, 35 and 52, in the open position is adjustable and limited by the use of the forward motion stop adjustment bolt 75 and the forward motion rubber stop block 76. Both of these components are attached to the inwardly facing most forward edge of the outer boom 52, and when the booms are in their extended or open position, engage the outwardly facing most reward edge of the inner boom 35 and ensure that the boom assembly 24 can not be opened to a point further than is desired.

The attachment of the outer boom hydraulic cylinder 55 to the boom pivot hinge 57 is accomplished by the use of the pivot hinge hydraulic cylinder mount 60 which is a portion of the boom pivot hinge 57. The pivot hinge hydraulic cylinder mount 60 has extending rearward a cylinder mounting extension 61 which is a metal tab that provides the mounting point for the front end of the outer hydraulic cylinder 55. This mounting is accomplished by passing the outer boom cylinder front mounting bolt 63 through the mounting extension 61 and the most forward end of the outer boom cylinder 55.

An additional cylinder mounting extension 61 extends forward from the pivot hinge hydraulic cylinder mount 60 which provides the mounting point for the inner boom hydraulic cylinder 43. The inner boom hydraulic cylinder 43 extends forward from this point and fits inside of the inner hydraulic cylinder frame 44. The inner hydraulic cylinder frame 44 is a flat relatively wide piece of metal that initially starts at one side of the boom knuckling hinge 77 to which it is attached and vertically extends upward for a short distance and has its broad edge facing outward relative to the inner boom cylinder 43. At the upper end of this vertical surface, the cylinder frame 44 is folded and bent in a manner that it now extends forward with its broad surface being roughly parallel to the upper surface of the lower inner boom arm 36. At the end of its forward extension, it is bent so that it extends upward for a short length where it is again bent so that it extends rearward with its broad surface again being roughly parallel to the upper surface of the inner boom arm 36. At this point, the inner hydraulic cylinder frame 44 extends back downward to the boom knuckle hinge 77 but on the other side of and from a higher point in relation to the inner boom arm 36. Thus, the inner hydraulic cylinder frame 44 forms a case within which the inner boom hydraulic cylinder 43 is held and to which, at the forward closing bend, the forward end of the inner boom hydraulic cylinder is attached by the use of the inner boom cylinder front mounting bolt 45. Finally, the inner boom cylinder is attached at its most forward end to the inner boom cylinder frame 44 by passing the inner cylinder mounting bolt 62 through both the inner cylinder frame 44 and the inner boom cylinder 43.

Hydraulic pressure to open and close the inner and outer hydraulic cylinders, 43 and 55, is supplied by the main hydraulic pressure line 47 which is attached to an external source and runs the length of the inner boom 35 to where it is attached to the inner boom hydraulic cylinder 43. The hydraulic pressure is then transferred to the outer boom hydraulic cylinder 55 by the pressure transfer line 48 which extends the reward portion of the outer boom cylinder 55. The cylinder to cylinder return line 49 transfers the return fluid from the front of the outer boom cylinder 55 to the inner boom cylinder 43 where it is transferred to the main hydraulic return line 50 and returned to the external hydraulic pressure source. It is important to note that the pressure transfer line 48 and the cylinder to cylinder return line 49 both span the boom hinge assembly 51 and are long enough to allow the inner and outer booms, 35 and 52, to freely pivot as the design requires.

Figure 15:
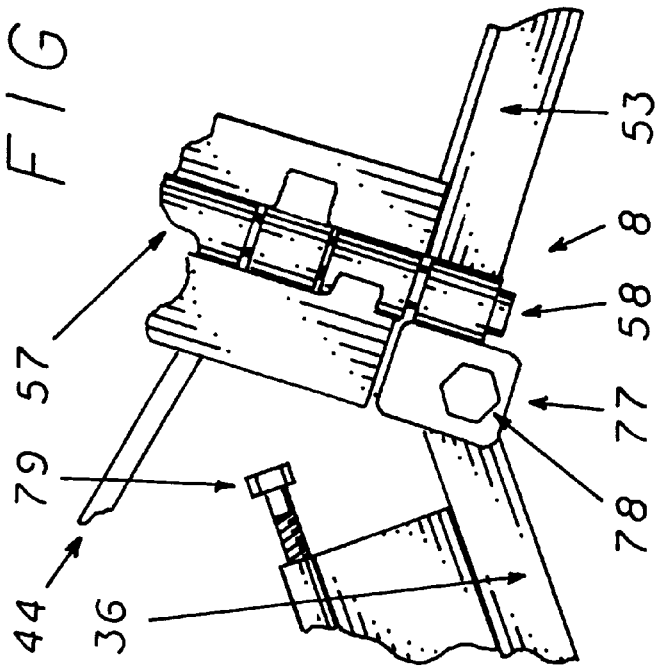
FIG. 15 is a close-up rear elevation cut-away view of the boom knuckling hinge assembly of the present invention again detailing the manner in which this component works to allow the inner and outer boom assemblies to pivot along the vertical plane.
Figure 14:
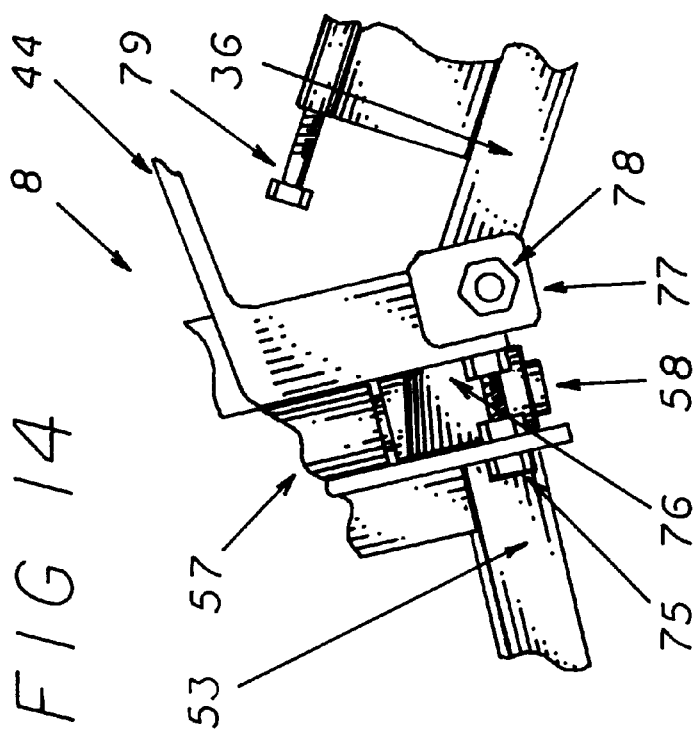
FIG. 14 is a close-up front elevation cut-away view of the boom knuckling hinge assembly of the present invention detailing the manner in which this component works to allow the inner and outer boom assemblies to pivot along the vertical plane.

The primary component of the knuckle assembly 8 is the boom knuckling hinge 77 and is illustrated by FIGS. 4, 14 and 15. As previously described, the boom knuckling hinge 77 connects the inner and outer booms, 35 and 52, at the front of the lower inner boom arm 36 at a point just in front of the boom pivot hinge 51 and at the base of the inner boom hydraulic cylinder frame 44. The inner boom arm's 36 connection to the boom hinge assembly 51 is made by passing the knuckling hinge bolt 78 through one side of the boom knuckling hinge 77, through the span of the lower inner boom arm 36 and out the other side of the knuckling pivot hinge 77 where it is fastened in a manner which allows the inner and outer booms, 35 and 52, to pivot freely. Additionally, the knuckling pivot hinge 77 is equipped with an adjustable knuckling upward stop bolt 79 which is located on the most forward inner surface of the lower boom arm 36 and extends to engage a portion of the inner boom cylinder frame 44 and serves to limit the closing action of the knuckling pivot hinge 77.

Figure 6:
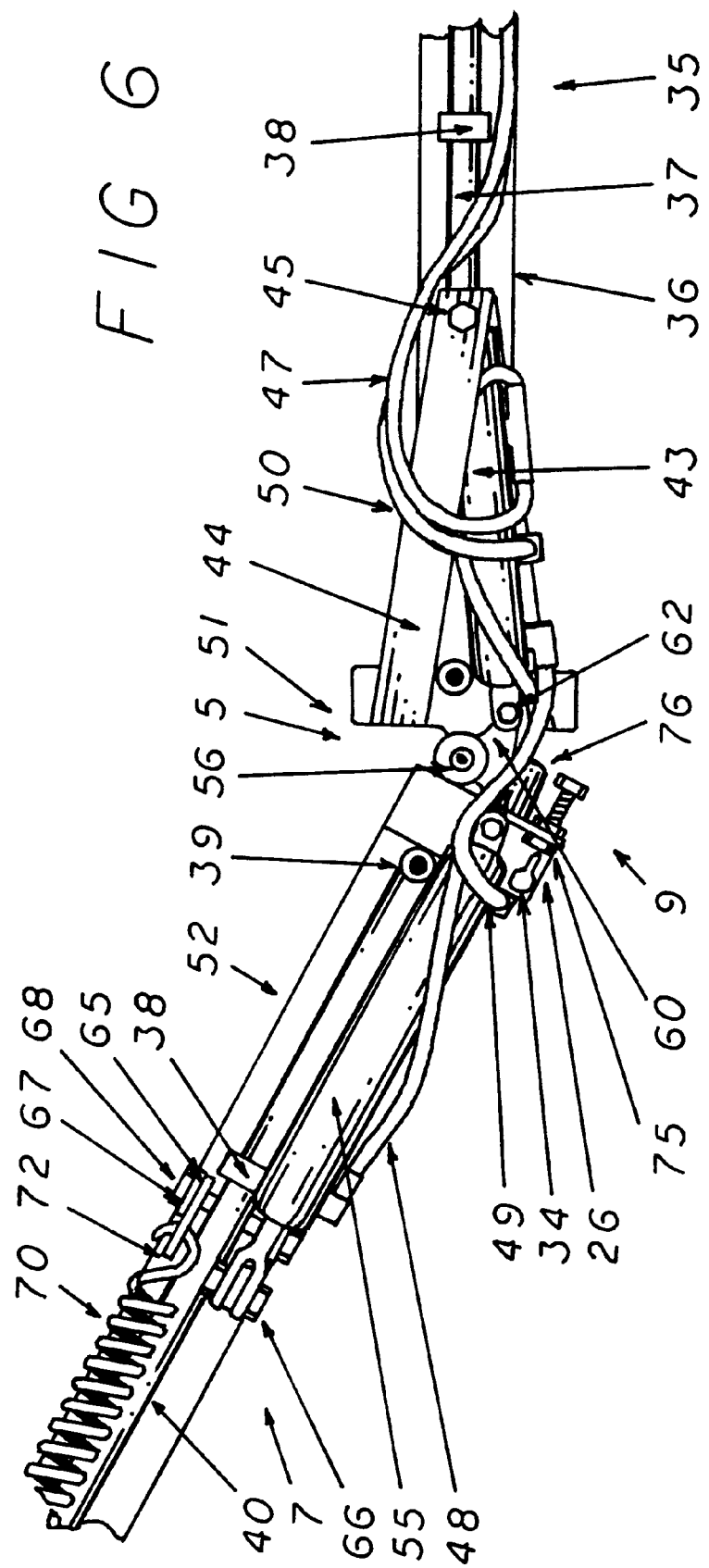
FIG. 6 is a top elevation cut-away view of the present invention showing the manner in which the breakaway spring assembly allows the outer boom to flex in a backward manner when confronting an obstacle.
Figure 16:
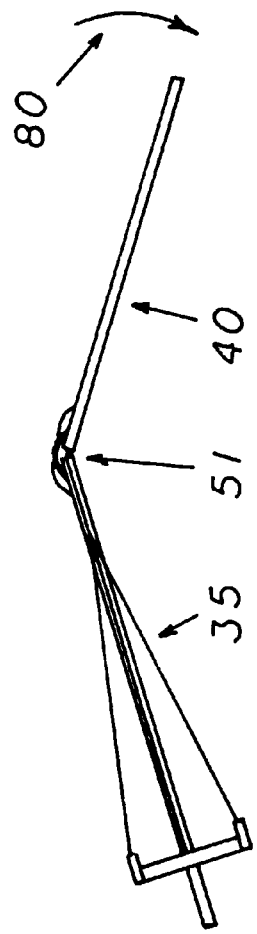
FIG. 16 is a top elevation view of the present invention showing the manner of movement when the breakaway spring assembly is engaged after an obstruction is encountered by the outer boom during forward travel.

The manner of operation of breakaway assembly 7 is illustrated by FIGS. 6, 7 and 9 and the net effect on the inner and outer booms, 35 and 52, is diagramed in FIG. 16. The breakaway action of the outer boom 52 occurs when the forward progress of the boom assembly 24 is impeded by an obstacle in its path. The breakaway assembly 7 allows the outer boom 52 to flex in a rearward manner when this occurs, thus, absorbing the impact of such a collision. This insures that any damage that may have been normally caused by such an incident will be avoided by the use of the present invention.

When an object impacts the outer boom 52, a pivotal force acts upon the boom hinge assembly 51. In a normal configuration, the boom hinge assembly 51 is unable to compensate for this even though the it is hinged. This is due to the fact that the hinge assembly 51 is normally activated only in the folding mode by the inner outer hydraulic cylinders, 43 and 55, which, unless activated by hydraulic pressure, are incapable of expanding or contracting. This makes the entire length of the boom assembly 24 ridged and subject to damage during operation.

The breakaway motion 80 is facilitated by the use of the breakaway assembly 7 located on the inner part of the outer boom 52. The breakaway assembly 7 is primarily made up of the breakaway mount block 65 and the breakaway load spring 70 which are connected at their most reward end to the outer boom frame 53 and at the forward most end to the boom hinge assembly 51 through the outer boom hydraulic cylinder 55. The breakaway mount's 65 pivotal mounting and the breakaway load spring 70 allow these components to move to absorb any shock created by a forward collision.

As force is applied to the outer boom 52, the upper portion of the breakaway mount block 65, at the point where the outer boom hydraulic cylinder 55 is attached, pivots forward. This effectively moves the rear attachment point of the outer boom cylinder 55 and allows the boom hinge assembly 51 to pivot in response to an impact. The breakaway load spring 70 serves both to limit the forward pivot of the breakaway mount block 65 and to keep tension on it during normal conditions to ensure the boom assembly 24 remains straight.

The manner of operation of the fold assembly 9 is illustrated in FIGS. 12 and 17. The fold assembly 9 functions to allow the boom assembly 24 to be folded in on itself to aid in transport and storage. The folding motion 81 is facilitated by the use of the inner and outer boom hydraulic cylinders, 43 and 55, which are attached at their inner ends, with respect to the hinge assembly 51, to the pivot hinge hydraulic cylinder mount 60. The pivot hinge hydraulic cylinder mount 60 is a component of the boom pivot hinge 57 which has two extending tabs, one facing forward and the other facing rearward, to which the inner and outer boom cylinders, 43 and 52, are attached.

To fold the boom assembly 24, the user engages the inner and outer boom hydraulic cylinders, 43 and 55. As the hydraulic pressure expands the cylinders against the pivot hinge cylinder mount 60, the outer boom 35 is forced to pivot around the boom pivot assembly 51. This motion is continued until the outer boom 52 folded against the inner boom 35 for storage or transport. To open the boom assembly for chemical application, the user simply reverses this process until the outer boom 52 is fully extended and the boom assembly 24 is again straight.

The manner of operation of the knuckling assembly 8 is illustrated by FIGS. 13, 14, 15 and 18. The primary component of the knuckling assembly 8 is the boom knuckling hinge 77, (producing the knuckling motion 80) which serves as the main connection apparatus between the inner boom 35 and the outer boom 52. The knuckling hinge 77 is fixedly attached to the boom pivot hinge 57 and pivotally attached to the lower inner boom arm 36. This configuration allows the inner and outer booms, 35 and 52, to pivot around the knuckling hinge 77 in respect to one another in a vertical plane. This design gives the boom assembly 24 the ability to flex in the central portion and compensate for uneven terrain encountered by the spraying apparatus.

The design of the boom knuckling hinge 77 enables it to counteract sudden vertical changes by keeping the outer boom 52 in an attitude that is relatively parallel to the surface of the ground. Therefore, in the general configuration when the wheels on the right side of the driving vehicle suddenly drop due to encountering a rut or other irregularity, the response is for the boom on the left side of the vehicle to be raised. The result of this is that the distance between the boom assembly 24, and therefore the spray nozzles 38, constantly varies causing inconsistent chemical spraying patterns. The boom knuckling hinge 77 allows the outer boom 52 to raise or lower to keep it in a more horizontal attitude depending upon the type of obstacle encountered.

Although the present invention has been described in considerable detail with reference to certain preferred versions thereof, other versions are possible. Therefore, the spirit and scope of the appended claims should not be limited to the description of the preferred versions contained herein.

What is claimed is:

1. A left and right sprayer boom hinge assembly for use on a sprayer apparatus having a main sprayer frame with a left and right inner boom assembly having inner and outer ends with said inner ends pivotally connected to said main sprayer frame, a left and right outer boom assembly having inner and outer ends with said inner ends of said outer boom assemblies pivotally connected to said outer ends of said inner boom assemblies by said boom hinge assemblies each of said boom hinge assemblies comprising:

- a vertical boom pivot hinge for pivotally moving said outer boom relative to said inner boom between an in-use position wherein said inner and outer booms are aligned linearly and a transport position wherein said inner boom and said outer booms are folded side by side and substantially parallel to each other;
- a horizontal boom knuckling hinge that allows said outer boom to move in a vertical plane relative to said inner boom when said booms are in an in-use position; and
- a hydraulic cylinder means for pivotally moving said outer boom about said vertical boom pivot hinge.

2. A left and a right sprayer boom hinge assembly for use on a sprayer apparatus as in claim 1 further comprising a breakaway means for holding said outer booms in a biased in-use position.

3. A sprayer boom hinge assembly for use on a sprayer apparatus as in claim 2 wherein said hydraulic cylinder means comprises a first and second hydraulic cylinder.

4. A sprayer boom hinge assembly for use on a sprayer apparatus as in claim 3 wherein said breakaway means comprises:

- a cam pivotally mounted to said second hydraulic cylinder at a first location on said cam, said cam being further pivotally mounted to said outer boom; and
- a spring section having a first and second end with said first end pivotally connected to said cam and said second end adjustably connected to said outer boom.

5. A sprayer boom hinge assembly for use on a sprayer apparatus as in claim 4 wherein said spring is adjustably attached using a threaded I bolt.

6. A sprayer boom hinge assembly for use on a sprayer apparatus as in claim 4 wherein said outer boom is held in a biased, level position by a truss and cable system.

7. A sprayer boom hinge assembly for use on a sprayer apparatus as in claim 6 wherein said cam further comprises an adjustable stop to vary the position of said outer boom when said outer boom is in said transport position.

8. A left and right sprayer boom hinge assembly for use on a sprayer apparatus having a main sprayer frame with a left and right inner boom assembly having inner and outer ends with said inner ends pivotally connected to said main sprayer frame, a left and right outer boom assembly having inner and outer ends with said inner ends of said outer boom assemblies pivotally connected to said outer ends of said inner boom assemblies by said boom hinge assemblies each of said boom hinge assemblies comprising:

- a vertical boom pivot hinge for pivotally moving said outer boom relative to said inner boom between an in-use position wherein said inner and outer booms are aligned linearly and a transport position wherein said inner boom and said outer booms are folded side by side and substantially parallel to each other;
- a horizontal boom knuckling hinge, mounted on said inner boom side of said vertical boom pivot hinge, so as to allow said outer boom to move in a vertical plane relative to said inner boom when said booms are in an in-use position;
- a first and a second hydraulic cylinder means for pivotally moving said outer boom about said vertical boom pivot hinge; and
- a breakaway means for holding said outer booms in a biased in-use position said breakaway means being connected between said hydraulic cylinders and said outer boom.

9. A sprayer boom hinge assembly for use on a sprayer apparatus as in claim 8 wherein said breakaway means comprises:
- a cam pivotally mounted to said second hydraulic cylinder at a first location on said cam, said cam being further pivotally mounted to said outer boom; and
- a spring section having a first and second end with said first end pivotally connected to said cam and said second end adjustably connected to said outer boom.

10. A sprayer boom hinge assembly for use on a sprayer apparatus as in claim 9 wherein said spring is adjustably attached using a threaded I bolt.

11. A sprayer boom hinge assembly for use on a sprayer apparatus as in claim 9 wherein said outer boom is biased in a level position by a resilient truss and cable system.

12. A sprayer boom hinge assembly for use on a sprayer apparatus as in claim 11 wherein said cam further comprises an adjustable stop to vary the position of said outer boom when said outer boom is in said transport position.

13. A sprayer boom hinge assembly for use in a sprayer apparatus as in claim 12 wherein said horizontal boom knuckling hinge further comprises an adjustable knuckling upward stop.

14. A boom hinge assembly for sprayer apparatus having folding inner booms and attached folding outer booms wherein said boom hinge assembly connects said outer and said inner booms, said boom hinge assembly comprises:
- a pivot hinge for folding said outer boom along said inner boom and back to an outward extension position from said inner boom;
- a boom knuckling hinge, mounted on said inner boom side of said boom pivot hinge, so as to allow said outer boom to move in a vertical plane relative to said inner boom;
- a powered means for moving said outer boom about said pivot hinge; and
- a breakaway means that biases said outer boom in an outward position.

15. A boom hinge assembly for sprayers as in claim 14 wherein said powered means comprises a first and a second hydraulic cylinder means for pivotally moving said outer boom about said boom pivot hinge.

16. A boom hinge assembly for sprayers as in claim 15 wherein said sprayer boom hinge assembly for use on a sprayer apparatus as in claim 15 wherein said breakaway means comprises:
- a cam pivotally mounted to said second hydraulic cylinder at a first location on said cam, said cam being further pivotally mounted to said outer boom; and
- a spring section having a first and second end with said first end pivotally connected to said cam and said second end adjustably connected to said outer boom.

17. A boom hinge assembly for use on a sprayer apparatus as in claim 16 wherein said outer boom is biased in a level position by a resilient truss and cable system.

18. A boom hinge assembly for use on a sprayer apparatus as in claim 17 wherein said cam further comprises an adjustable stop to vary the position of said outer boom when said outer boom is in said transport position.

19. A boom hinge assembly for use in a sprayer apparatus as in claim 18 wherein said horizontal boom knuckling hinge further comprises an adjustable knuckling upward stop.

* * * * *